(12) United States Patent
Camelot et al.

(10) Patent No.: US 7,687,092 B2
(45) Date of Patent: Mar. 30, 2010

(54) ENCAPSULATED CRYSTALLINE LACTIC ACID

(75) Inventors: Damien Michel André Camelot, Zaltbommel (NL); Elize Willem Bontenbal, Wageningen (NL)

(73) Assignee: Purac Biochem B.V., Gorinchem (NL)

( * ) Notice: Subject to any disclaimer, the term of this patent is extended or adjusted under 35 U.S.C. 154(b) by 1770 days.

(21) Appl. No.: 10/631,831

(22) Filed: Aug. 1, 2003

(65) Prior Publication Data
US 2004/0115315 A1 Jun. 17, 2004

Related U.S. Application Data

(60) Provisional application No. 60/400,045, filed on Aug. 2, 2002.

(51) Int. Cl.
*A23B 4/12* (2006.01)
(52) U.S. Cl. .................. 426/99; 426/292; 426/321; 426/335; 426/573; 426/601
(58) Field of Classification Search .......... 426/98, 426/601, 641, 453, 321, 302, 99, 292, 335, 426/513
See application file for complete search history.

(56) References Cited

U.S. PATENT DOCUMENTS

| | | | |
|---|---|---|---|
| 2,648,609 A | 8/1953 | Wurster | |
| 2,799,241 A | 7/1957 | Wurster | |
| 2,992,116 A | 7/1961 | Sair | |
| 3,015,128 A | 1/1962 | Somerville, Jr. | |
| 3,110,626 A | 11/1963 | Larson et al. | |
| 3,159,874 A | 12/1964 | Langer et al. | |
| 3,279,994 A | 10/1966 | Koff | |
| 3,341,466 A | 9/1967 | Brynko et al. | |
| 3,359,120 A | 12/1967 | Meusel et al. | |
| 3,560,222 A | 2/1971 | Delaney | |
| 3,819,838 A | 6/1974 | Smith et al. | |
| 4,262,027 A | 4/1981 | Tonner et al. | |
| 4,497,845 A | 2/1985 | Percel et al. | |
| 4,511,584 A | 4/1985 | Percel et al. | |
| 4,511,592 A | 4/1985 | Percel et al. | |
| 4,537,784 A | 8/1985 | Percel et al. | |
| 4,576,825 A | 3/1986 | Tracy et al. | |
| 4,713,251 A | 12/1987 | Seighman | |
| 4,772,477 A | 9/1988 | Weiss et al. | |
| 6,153,236 A * | 11/2000 | Wu et al. ............... 426/98 | |

FOREIGN PATENT DOCUMENTS

| | | |
|---|---|---|
| CH | 527 570 | 9/1972 |
| EP | 527570 A1 | 2/1993 |
| EP | 699392 A2 | 3/1996 |
| GB | 1 330 794 | 9/1973 |

OTHER PUBLICATIONS

Borsook, H. et al. "The Preparation of Crystalline Lactic Acid", Kerckhoff Laboratories of Biological Sciences, California Institute of Technolgy, Pasadena, CA, Jun. 7, 1933, pp. 449-460.*
Schouten et al. (Low Temperature Crystal Structure and Molecular Conformation of L(+) Lactic Acid, J. Mol. Structure, 323: 165-168 (1994)).
D. Jones & P. Percel (Coating of Multiparticulates Using Molten Materials Formulation and Process Consideration, Multiparticle Oral Drug Delivery, Chapter 6, Marcel Dekker Inc. (1994)).
Neumuller, Otto-Albrecht: "Rompps Chemie-Lexikon", 1995, Franckh'sche Verlagsbuchhandlung, W. Keller & Co., Stuttgart XP002220562, p. 2616.

* cited by examiner

*Primary Examiner*—Helen F Pratt
(74) *Attorney, Agent, or Firm*—Gilberto M. Villacorta; Sunit Talapatra; Foley & Lardner LLP

(57) ABSTRACT

The present invention relates to encapsulated lactic acid, where lactic acid is in a solid, pure, crystalline form. The encapsulation of food acids is common practice. Many companies produce encapsulated citric, tartaric and sorbic acids or GDL. However, lactic acid, a major food acid for its flavour and conservation effect, is not available in a pure solid crystalline encapsulated form. As no substrate is needed for said coated solid lactic acid particles, the lactic acid content of said particles may be very high and the activity of the lactic acid is not impaired by the substrate. Furthermore, the encapsulated solid lactic acid particles according to the invention are easy to handle and are less expensive than encapsulated liquid lactic acid.

26 Claims, No Drawings

ENCAPSULATED CRYSTALLINE LACTIC ACID

CROSS REFERENCE TO RELATED APPLICATIONS

This application claims priority under 35 U.S.C. § 119(e) to U.S. Provisional Application No. 60/400,045, filed on Aug. 2, 2002, the entire disclosure of which is hereby incorporated herein by reference.

FIELD OF THE INVENTION

This invention is in the field of encapsulated food products, in particular encapsulated food-grade acids and more in particular encapsulated of food-grade crystalline lactic acid, its preparation, and foodstuff containing said encapsulated crystalline lactic acid.

BACKGROUND OF THE INVENTION

The use of acids in the food industry is well known. For example in the making of dry or semi dry sausages, lactic acid producing bacteria has long been used in order improve flavour and conservation of the product. Most often, encapsulated acids are used for controlled release of acid in a food composition. The control-release mechanisms vary with the application. Some applications require a temperature release (when the product is exposed to a given temperature the acid is released; fat/oil coatings), water release (when the product is exposed to water release takes place; water soluble coatings), pH release, and the like. The aim is to protect the encapsulated core from the environment up to the time when it is needed. Different applications require a different level of encapsulation. Typically, for an application where temperature release is required, the quality of the encapsulation is judged by the percentage of release of the product dispersed in water at room temperature. A 90% encapsulation refers to a product releasing 10% (w/w) of core ingredient in the water at room temperature after a given time. Similarly, the release of the food ingredient can be directly measured in the application itself through different analytical methods.

The use of encapsulated food acids in meat was first reported in the early 1960's. At first, the use of glucono delta lactone (GDL) for curing purposes was described in U.S. Pat. No. 2,992,116. Shortly after, in U.S. Pat. Nos. 3,359,120 and 3,560,222, encapsulated food acid was reported to have similar effects. In the same period, patent applications were filed for the production of encapsulated food acids. The processes used were very diverse: from top-spray fluid bed coating to coacervation, and from co-axial extrusion to spray drying techniques.

Lactic acid is widely used in the food industries, such as in the dairy, meat, and bakery industries and in the confectionery industry. Lactic acid is also often reported as being used in a coated form in a food composition. See, for instance, CH 527 570, U.S. Pat. Nos. 4,262,027, and 4,576,825. However, these patents disclose the use of lactic acid in the liquid form, and it is necessary to combine the liquid lactic acid with a solid substrate in order to obtain a solid composition. In CH 527 570, lactic acid is combined with glucose, in U.S. Pat. No. 4,497,845 with a solid carrier, in U.S. Pat. No. 4,511,584 with micro-cellulose or calcium lactate, and in U.S. Pat. Nos. 4,511,592, 4,772,477, and 6,153,236, the lactic acid is platted on calcium lactate. In U.S. Pat. No. 4,576,825, liquid lactic acid is encapsulated using a co-axial-extrusion method.

In all patents where the use of coated lactic acid is reported and where the lactic acid is mixed with another component in order to be solid, the other component does not bring any additional advantages. Its effect is limited to the solidification of lactic acid either by absorption (glucose, starches, microcellulose) or by reaction (calcium lactate). The content of lactic acid in these products does not exceed 60% (w/w) usually due to the extra components. Often, the content of lactic acid of the final products presented in these patents does not exceed 50%, and more commonly it does not exceed 30% (w/w). Moreover, the products combined with lactic acid to render it solid can have adverse effects on the application. For example the calcium lactate combined with the lactic acid has a buffering action on the lactic acid. Also, encapsulation of liquid lactic acid requires expensive equipment and the resulting encapsulated liquid lactic acid is expensive and difficult to handle.

Crystalline Lactic acid is described by Schouten et al. (Low Temperature Crystal Structure And Molecular Conformation Of L(+) Lactic Acid, *J. Mol. Structure*, 323: 165-168 (1994)). Even though crystalline lactic acid had been known, it is difficult to crystallize lactic acid owing to the instability of the crystals, which are very hygroscopic. Due to this hygroscopicity, and due to the separation method used in the classical crystallization process, there is a liquid phase at the surface of the crystals. Further, the handling of the crystal is difficult because when the crystals contact air, they absorb water, increasing the amount of liquid phase present at the crystal surface.

These and other deficiencies are overcome using the products and methods of the present invention, as described below.

SUMMARY OF THE INVENTION

The present invention is directed to a composition comprising an encapsulated crystalline lactic acid particle. More preferably, the present invention is directed to an encapsulated crystalline lactic acid particle wherein the crystalline lactic acid particle comprises crystalline L(+) lactic acid.

In one embodiment, the crystalline lactic acid particle is encapsulated within a food-grade coating material comprising oil, fat, wax, carbohydrate, protein, polymer, or a mixture thereof. In a more preferred embodiment, the food-grade coating material has a melting point between about 35 and 90° C. In an even more preferred embodiment, the food-grade coating material is a vegetable oil.

In another embodiment, the crystalline lactic acid particle of the present invention has been treated with a wetting agent prior to or during encapsulation. Preferably, the wetting agent is silica, starch, calcium lactate, methyl cellulose, or a combination thereof. One particularly preferred embodiment comprises silica powder as a wetting agent and a partially hydrogenated fraction of a palm oil melting at 61° C. as an encapsulating coating. In this or any other embodiment, the encapsulated particle comprises up to 95%(w/w) lactic acid based on the total weight of the encapsulated particle, the coating material or coating material plus wetting agent represents about 5 to 70%(w/w) of the encapsulated particle. In other embodiments, the coating material or coating material plus wetting agent represents about 30 to 60%(w/w) of the encapsulated particle.

Preferably, in a water dispersion test at room temperature, less than 10%(w/w) of the lactic acid is released into the water after 60 minutes.

The present invention is also directed to food product compositions, and methods of preparing food products, containing the encapsulated crystalline lactic acid particle of the present invention. Preferably, the food product comprises a comminuted meat product, a bakery product, or an acid-sanded candy. In these embodiments, adding encapsulated crystalline lactic acid particles to the food product enhances the color, flavor, or shelf-life of the food product compared to a similar food product prepared without adding lactic acid. In one preferred embodiment, the acid-sanding of candies is performed wherein the candies are acid-sanded with encapsulated crystalline lactic acid particles.

Even further, the present invention is directed to methods of preparation of encapsulated crystalline lactic acid particles. In a preferred embodiment, the method comprises preparing crystals of lactic acid and coating the crystals with an encapsulating coating material. Preferably, the lactic acid crystals are about 200 to 800 microns in size. In a preferred embodiment, the lactic acid crystals are encapsulated using a top-spray fluid bed coater.

DETAILED DESCRIPTION OF THE INVENTION

The present invention provides encapsulated solid lactic acid particles. As no substrate is needed for said coated solid lactic acid particles, the lactic acid content of said particles may be very high and the activity of the lactic acid is not impaired by the substrate. Furthermore, the encapsulated solid lactic acid particles according to the invention are easy to handle and are less expensive than encapsulated liquid lactic acid.

The invention relates to an encapsulated crystalline lactic acid. Encapsulated crystalline lactic acid is novel and its use in foodstuff has not been described before. The crystalline lactic acid for encapsulation can be obtained cooling an aqueous solution of lactic acid. Thus, after encapsulation, an encapsulated crystalline lactic acid particle is obtained. It is desirable to use L(+) lactic acid as it is the type of lactic acid which can be taken up by the human body and which naturally occurs in the human body.

For encapsulation any conventionally-used coating material in the foodstuff industry may be used. However, when using meltable coating material, the melting point of lactic acid crystals (56° C.) puts some restrictions on the choice of material: meltable coating material with melting points up to 66° C. may be used provided that the proper coating conditions are used. Examples of suitable coating material comprise oils and fats, waxes (bees' wax, paraffin), carbohydrates (sugars, e.g. poysaccharides, glucose syrups, maltodextrins, starch, gums), proteins (both animals and vegetables), polymers (polylactic acid) or mixtures thereof.

Generally, coating material for foodstuff is divided into three types: those that melt upon application of heat, those that dissolve in the moisture present in the foodstuff or the foodstuff preparation process, and those wherein release is induced by pH change. Of course, coating materials also exist which function based on combinations of the above.

According to the invention the crystalline lactic acid may be encapsulated by water-soluble coating material, meltable coating material, and/or pH induced-release coating material. The crystalline lactic acid particles may also be combined with other active ingredients to prepare so-called multiple-core or onion skin encapsulated particles. The various active ingredients may be divided or separated by layers of coating materials, which may be the same or different. Examples of other active ingredients are vitamins, flavors, spices, carotenoids, and the like.

For the encapsulation of crystalline lactic acid according to the present invention, at least partially meltable coating material is particularly suitable. Preferably, the food-grade coating material has a melting point between about 35 and 90° C., as this is the temperature at which most foodstuffs, such as sausages and other meat containing foodstuffs, are prepared. Examples of foodstuffs that are prepared in this temperature range are comminuted meat such as cooked sausages (Frankfurters, Bologni, Mortadella), paté, liver sausages, and the like.

As mentioned above, water-soluble coating materials which at least partially dissolves in the moisture present in the foodstuff or in the foodstuff preparation method are also suitable. This type of coating material can be used in foodstuff which is prepared at relatively low temperatures, such as summer sausage, pepperoni, pork roll, and salami-type products such as cervelats. Examples of suitable water-soluble coating materials include glycerides, such as acetylated monoglyceride and diglycerides, and mixtures of glycerides and hydrogenated vegetable oils. Suitable hydrogenated vegetable oils include triglycerides, such as hydrogenated cotton seed, corn, peanut, soybean, palm, kernel, babassu, sunflower and safflower oils, and the like.

As mentioned above, crystalline lactic acid particles are very hygroscopic and carry a liquid phase at their surface. The liquid phase at the crystal's surface hampers encapsulation when the lactic acid is not properly wetted by the coating material. It is found that proper wetting can be ensured by adding a wetting agent to the lactic acid crystals. Suitable wetting agents include silica, potato starch, calcium lactate, methyl cellulose and other types of porous food-grade materials with proper particle sizes. Normally between about 0.5 and 5% (w/w) wetting agent based on the total weight of the crystals is used. Another advantage of using a wetting agent is that the handling of the lactic acid crystals has been improved. It is also possible to add surfactants to the coating material, or to vacuum dry the lactic acid crystals to improve the wetting of the coating material.

A particularly preferred encapsulated crystalline lactic acid particle comprises silica powder wetting agent and a partially hydrogenated fraction of a palm oil melting at 61° C. as the encapsulating material.

The particle size of the lactic acid crystals is generally between about 200 and 800 micrometers. Said particle size distribution can readily be set by controlling the crystallization conditions.

With the encapsulated crystalline lactic acid particles according to the invention, high lactic acid content in the particle may be obtained. Particles may be obtained containing up to 70, 80, 80, 95, or greater than 95 w/w % lactic acid. Generally the coating material represents 10-70% (w/w) of the particle, preferably 30-60% (w/w), and more preferably 30-40% (w/w), or about 5 to 70% (w/w) of the particle, preferably 5-30% (w/w), more preferably 5-20% (w/w), and most preferably 5-10% (w/w) based on the total weight of the particle. This means that particles have been obtained with a relatively high activity, so that lower amounts of encapsulated particles have to be added to the foodstuff to obtain the same effect provided by lactic acid compositions of the prior art. In a preferred embodiment of this invention, hydrogenated palm oil combined with a small fraction of silica is used as the coating material and the amount of solid crystalline lactic acid in the product is about equal to or higher than 50% (w/w), preferably about equal to or higher than 70% (w/w), and most preferably about equal to or higher than 90% (w/w).

As mentioned before the encapsulated food acids are used in many industries (Bakery, Meat, Confectionery, Cosmetic, Dairy, and the like). The preferred embodiment of this invention is directed toward the meat industry; more specifically, the use of food acid in comminuted meat such as sausages for conservation, color, and flavoring. In this application, it is of great importance that the encapsulated lactic acid is not released in the meat matrix before the cooking takes place. The early release of the lactic acid in the meat matrix would result in the denaturation of the proteins and a bad texture of the end product. The specification for encapsulated lactic acid in these products is to have less than 10% (w/w) release of acid in a water dispersion after 1 hour at room temperature.

With the present invention, encapsulated particles are provided having less than 10% (w/w) release of lactic acid in the water after 60 minutes following dispersion in water at room temperature.

The encapsulated crystalline lactic acid particle according to the invention may be prepared by any conventional coating method used in the food industry, such as spraying the coating material on the crystal lactic acid particles, which are fluidized; suspending the crystalline lactic acid particle in liquid coating material and spraying the suspension into a freezing chamber; and the like. Suitable encapsulation methods are described in U.S. Pat. Nos. 4,511,584, 4,511,592, 4,537,784, 3,819,838, 3,341,466, 3,279,994, 3,159,874, 3,110,626, 3,015,128, 2,799,241 and 2,648,609 the disclosures of which are incorporated herein by reference in their entirety.

Preferably, the encapsulated crystalline lactic acid particles are produced in a top-spray fluid bed coater. The method used for this production follows the guidelines for these processes given by D. Jones & P. Percel (*Coating of Multiparticulates Using Molten materials Formulation and Process Consideration, Multiparticle Oral Drug Delivery*, chapter 6, Marcel Dekker Inc. (1994)) the disclosure of which is incorporated herein in its entirety. That is, the inlet air temperature is approximately 10 to 15° C. below the melting point of the coating and atomizing air and spray liquid temperatures between 40 and 60° C. above the melting point of the coating. Specifically to the use of solid crystalline lactic acid, the inlet air has to be dried to ensure a low water content of the air. Alternatively, nitrogen can be used.

The present invention is further directed to a process for the preparation of comminuted meats wherein the encapsulated crystalline lactic acid particles according to the invention are added and to comminuted meat products containing the encapsulated crystalline lactic acid particles according to the present invention. Generally between about 0.01 and 2% (w/w), and preferably 0.3-0.6% (w/w), of lactic acid is used in comminuted meats, depending on the pH desired. The encapsulated crystalline lactic acid particles may be used for the preservation of color or flavor, and/or for conservation of shelf-life (i.e., preventing bacterial growth, maintaining texture of the food product, and the like).

As the encapsulated crystalline lactic acid particles according to the present invention are easier to handle than encapsulated liquid lactic acid, and have higher lactic acid amounts than encapsulated liquid lactic acid bound to a substrate, candies can be readily acid-sanded with the encapsulated crystalline lactic acid particles according to the invention. Encapsulated crystalline lactic acid particles according to the present invention can be used in acid-sanding processes well known by those in the confectionery industry.

For the same reason the encapsulated crystalline lactic acid particles are very suitable for flavor, conservation, and preserving shelf-life in bakery products. The invention is also directed to bakery products comprising the encapsulated crystalline lactic acid particles of the present invention. Encapsulated crystalline lactic acid particles according to the invention can be used in baking processes well known by those in the bakery industry.

The invention is further elucidated by means of examples which are to be construed as illustrative only and not as limiting.

EXAMPLES

Example 1

The release of acid from various products in a water dispersion test after 1 hour at room temperature was analyzed. Results can be seen in Table 1.

TABLE 1

Release Test Of Encapsulated Lactic Acid.

| | Product 1 | Product 2 |
|---|---|---|
| Lactic acid w/w % | 50% | 70% |
| Silica w/w % | 1% | 1% |
| Palm oil w/w % | 49% | 29% |
| Release of acid in w/w % | | |
| 10 minutes | 0.9% | 8.3% |
| 20 minutes | 1.3% | 13.1% |
| 30 minutes | 3.3% | 23.8% |
| 60 minutes | 6.1% | —* |

*not measured

Example 2

The use of encapsulated crystalline lactic acid was also tested in sausage application. The test was as follows: a meat emulsion with additives was made in a cutter. The encapsulated lactic acid was added to the meat emulsion and dispersed in the meat emulsion in an amount of 0.8 wt %. A cooked sausage was prepared containing the encapsulated crystalline lactic acid and compared to a control sausage where no acid was added. After cooking, the pH was measured. The initial pH of both sausages was about 5.6. After 2.5 hours, the pH in the cooked sausage containing the encapsulated lactic acid had decreased to a pH of about 5.2, whereas the pH the cooked sausage containing no lactic acid had increased to a pH of about 6.0.

Example 3

The effect of encapsulated crystalline lactic acid on the growth *Listeria monocytogenes* bacteria inoculated in cooked sausages was studied. The cooked sausage contained 0.6 wt % encapsulated crystalline lactic acid, the control sausage contained no lactic acid. It was shown that after 25 days at 7° C. virtually no growth of the *Listeria monocytogenes* bacteria was determined in the lactic acid-containing sausage, while in the control sausage a significant growth if the *Listeria monocytogenes* bacteria was determined.

The above examples have been depicted solely for the purpose of exemplification and are not intended to restrict the scope or embodiments of the invention. Other embodiments not specifically described should be apparent to those of ordinary skill in the art. Such other embodiments are considered to fall, nevertheless, within the scope and spirit of the present invention. Thus, the invention is properly limited solely by the claims that follow.

The invention claimed is:

1. A composition comprising an encapsulated particle comprising crystalline lactic acid and a wetting agent.

2. The composition of claim 1 wherein the crystalline lactic acid particle comprises crystalline L(+)lactic acid.

3. The composition of claim 1 wherein the crystalline lactic acid particle is encapsulated within a food-grade coating material comprising oil, fat, wax, carbohydrate, protein, polymer, or a mixture thereof.

4. The composition of claim 3 wherein the food-grade coating material has a melting point between about 35 and 90° C.

5. The composition of claim 1, wherein the food-grade coating material is a vegetable oil.

6. The composition of claim 1 wherein the wetting agent is silica, starch, calcium lactate, methyl cellulose, or a combination thereof.

7. The composition of claim 1 further comprising silica powder as the wetting agent and a partially hydrogenated fraction of a palm oil melting at 61° C. as an encapsulating coating.

8. The composition of claim 1 wherein the encapsulated particle comprises up to 95%(w/w) lactic acid based on the total weight of the encapsulated particle.

9. The composition of claim 7 wherein the coating material or coating material plus wetting agent represents about 5 to 70%(w/w) of the encapsulated particle.

10. The composition of claim 7 wherein the coating material or coating material plus wetting agent represents about 30 to 60%(w/w) of the encapsulated particle.

11. The composition of claim 1 wherein, upon dispersion in water at room temperature, less than 10%(w/w) of the lactic acid is released into the water after 60 minutes.

12. A food product composition comprising the encapsulated crystalline lactic acid particle of claim 1.

13. The food product composition of claim 12 wherein the food product comprises a comminuted meat product, a bakery product, or an acid-sanded candy.

14. A method of preparing a food product comprising adding encapsulated crystalline lactic acid particles comprising crystalline lactic acid and a wetting agent to the food product whereby the color, flavor, or shelf-life of the food product is enhanced compared to a similar food product prepared without adding lactic acid.

15. The method of claim 14 wherein the food product comprises a comminuted meat product, a bakery product, or an acid-sanded candy.

16. The method of claim 14 comprising the acid-sanding of candies wherein the candies are acid-sanded with encapsulated crystalline lactic acid particles.

17. A method of preparing encapsulated crystalline lactic acid particles comprising:
preparing crystals of lactic acid;
treating the crystals with a wetting agent prior to or during encapsulation; and
coating the crystals with an encapsulating coating material.

18. The method of claim 17 wherein the lactic acid crystals are about 200 to 800 microns in size.

19. The method of claim 17 wherein the lactic acid crystals are encapsulated using a top-spray fluid bed coater.

20. The method according to claim 17 wherein the wetting agent is silica, starch, calcium lactate, methyl cellulose, or a combination thereof.

21. An encapsulated particle comprising crystalline lactic acid and a wetting agent.

22. The encapsulated particle of claim 21 wherein the crystalline lactic acid particle comprises crystalline L(+)lactic acid.

23. The encapsulated particle of claim 21 wherein the crystalline lactic acid particle is encapsulated within a food-grade coating material comprising oil, fat, wax, carbohydrate, protein, polymer, or a mixture thereof.

24. The encapsulated particle composition of claim 23 wherein the food-grade coating material has a melting point between about 35 and 90° C.

25. The encapsulated particle of claim 21, wherein the food grade coating material is a vegetable oil.

26. The encapsulated particle of claim 21, wherein the wetting agent is silica, starch, calcium lactate, methyl cellulose, or a combination thereof.

* * * * *

UNITED STATES PATENT AND TRADEMARK OFFICE
CERTIFICATE OF CORRECTION

| | | |
|---|---|---|
| PATENT NO. | : 7,687,092 B2 | Page 1 of 1 |
| APPLICATION NO. | : 10/631831 | |
| DATED | : March 30, 2010 | |
| INVENTOR(S) | : Camelot et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1941 days.

Signed and Sealed this
Seventh Day of June, 2011

David J. Kappos
*Director of the United States Patent and Trademark Office*